US011230281B2

(12) United States Patent
Furusho et al.

(10) Patent No.: US 11,230,281 B2
(45) Date of Patent: Jan. 25, 2022

(54) DRIVING FORCE CONTROL METHOD AND DEVICE FOR HYBRID VEHICLE

(71) Applicant: Mazda Motor Corporation, Hiroshima (JP)

(72) Inventors: Kentaro Furusho, Hatsukaichi (JP); Hirofumi Nishimura, Hiroshima (JP); Tsuyoshi Goto, Aki-gun (JP); Yuta Enokizono, Itami (JP); Wataru Yamamoto, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 256 days.

(21) Appl. No.: 16/486,231

(22) PCT Filed: Feb. 23, 2018

(86) PCT No.: PCT/JP2018/006650
§ 371 (c)(1),
(2) Date: Aug. 15, 2019

(87) PCT Pub. No.: WO2018/155617
PCT Pub. Date: Aug. 30, 2018

(65) Prior Publication Data
US 2020/0231137 A1 Jul. 23, 2020

(30) Foreign Application Priority Data
Feb. 23, 2017 (JP) .............................. JP2017-032123

(51) Int. Cl.
*B60W 10/06* (2006.01)
*B60W 20/15* (2016.01)
(Continued)

(52) U.S. Cl.
CPC ............ *B60W 20/15* (2016.01); *B60W 10/06* (2013.01); *B60W 10/08* (2013.01);
(Continued)

(58) Field of Classification Search
None
See application file for complete search history.

(56) References Cited

U.S. PATENT DOCUMENTS

| 2012/0078456 A1* | 3/2012 | Hakumura | B60W 30/188 701/22 |
| 2016/0072417 A1* | 3/2016 | Cho | H02P 23/04 318/400.23 |

FOREIGN PATENT DOCUMENTS

| JP | 2006187168 A | 7/2006 | |
| JP | 2012-225243 | * 11/2012 | ............. F02D 41/16 |

(Continued)

OTHER PUBLICATIONS

Machine translation of JP2012-225243, 2012.*
(Continued)

*Primary Examiner* — James M McPherson
(74) *Attorney, Agent, or Firm* — Alleman Hall Creasman & Tuttle LLP

(57) ABSTRACT

Provided are a driving force control method and device for a hybrid vehicle, each capable of effectively absorbing torque fluctuation of an engine while suppressing deterioration in energy efficiency. The driving force control device for a hybrid vehicle comprises a PCM configured to: estimate an average torque output by an engine; estimate a torque fluctuation component of the torque output by the engine; set a countertorque for suppressing the estimated torque fluctuation component; and control an electric motor to output the set countertorque, wherein the PCM is operable, under the condition that the average torque output by the internal combustion engine is constant, to set a negative control gain such that, as an engine speed becomes higher, the absolute value of the control gain becomes smaller, and (Continued)

then to set the countertorque based on a product of the estimated torque fluctuation component and the control gain.

4 Claims, 7 Drawing Sheets

(51) Int. Cl.
*B60W 10/08* (2006.01)
*B60W 30/188* (2012.01)
*B60W 50/00* (2006.01)

(52) U.S. Cl.
CPC ... *B60W 30/188* (2013.01); *B60W 2050/0022* (2013.01); *B60W 2510/0638* (2013.01); *B60W 2510/0657* (2013.01); *B60W 2710/083* (2013.01)

(56) References Cited

FOREIGN PATENT DOCUMENTS

| | | |
|---|---|---|
| JP | 2013129260 A | 7/2013 |
| JP | 2013163436 A | 8/2013 |

OTHER PUBLICATIONS

Japanese Patent Office, Japanese Office Action Issued in Japanese Patent Application No. 2017-032123 dated Nov. 5, 2018, 4 pages.
European Patent Office, Extended European Search Report Issued in Application No. 18756924.9, dated May 20, 2020, Germany, 7 pages.

* cited by examiner

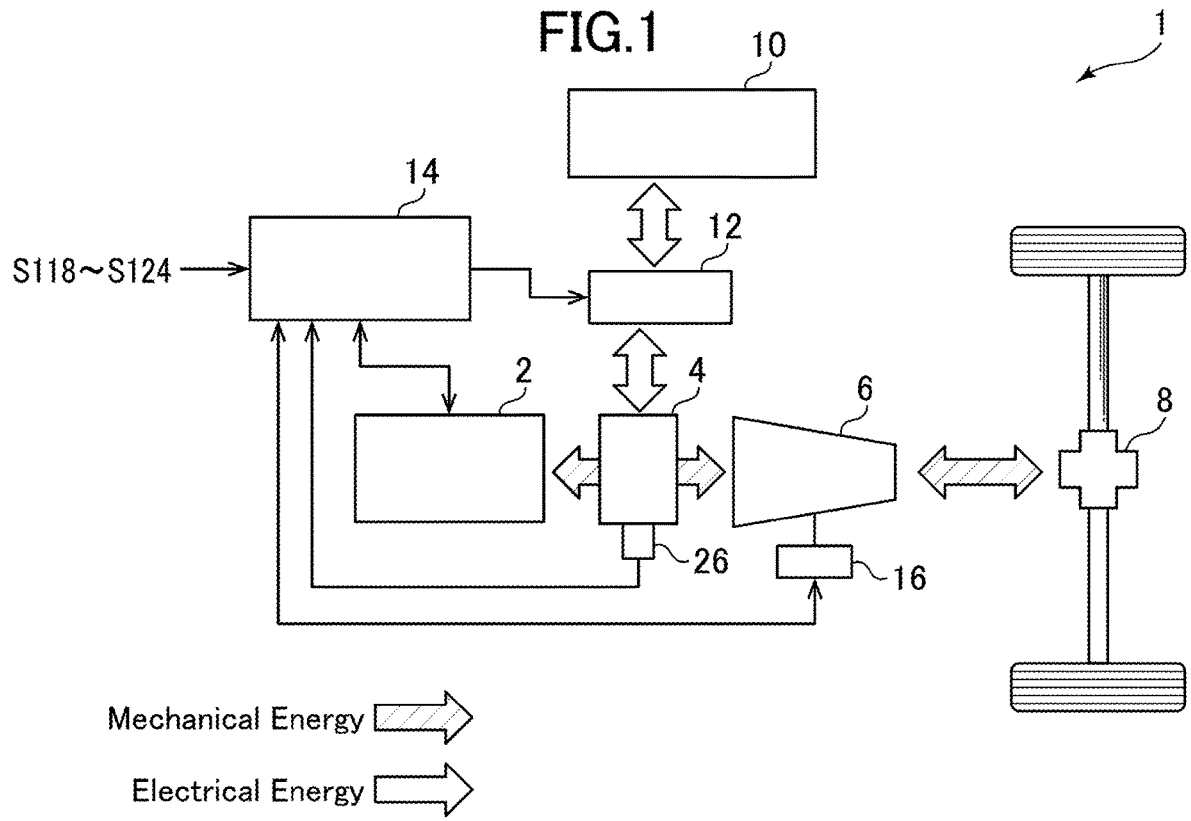
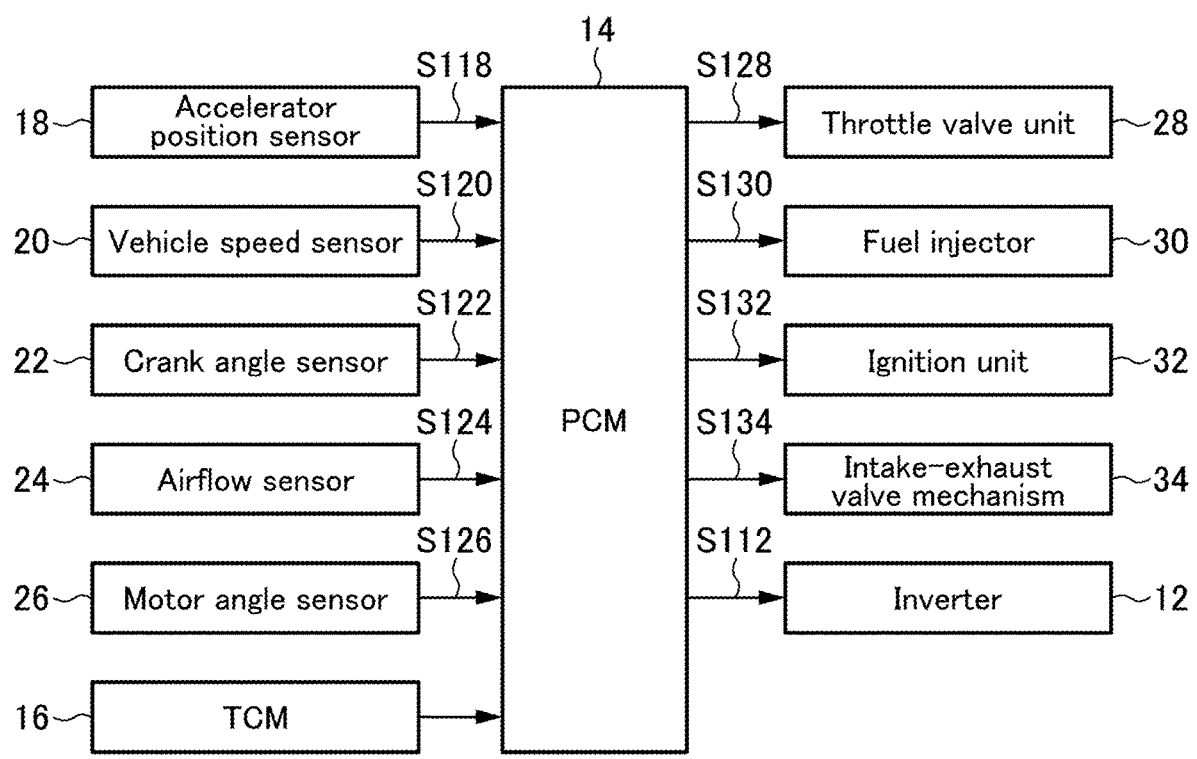

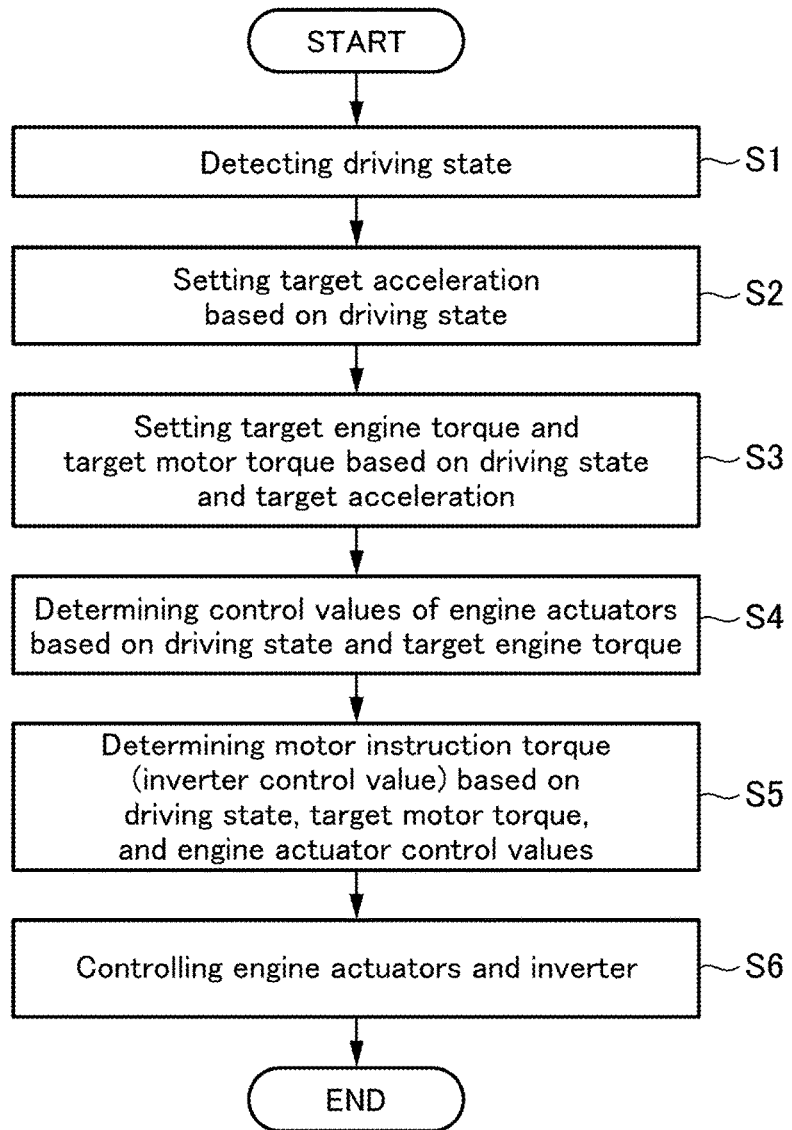
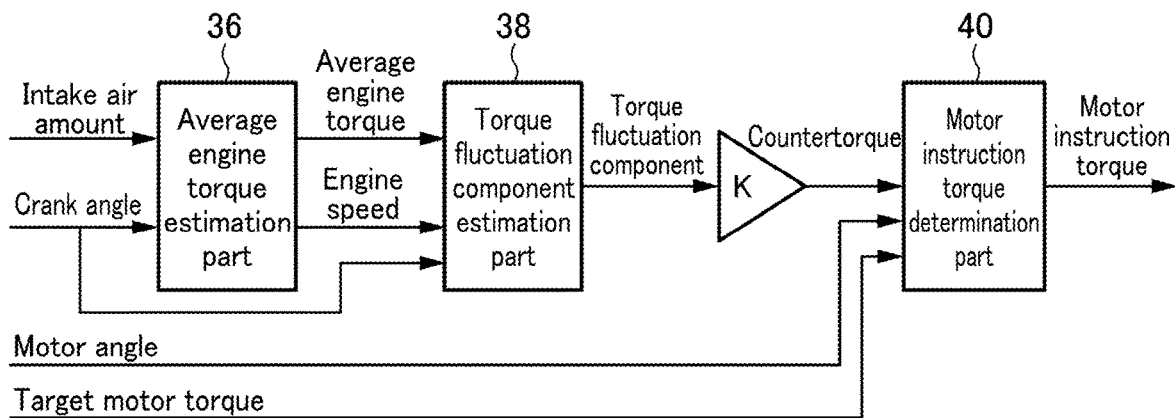

DRIVING FORCE CONTROL METHOD AND DEVICE FOR HYBRID VEHICLE

TECHNICAL FIELD

The present invention relates to a driving force control method and device for a hybrid vehicle, and more particularly to a driving force control method and device for a hybrid vehicle equipped with an internal combustion engine, a driving force transmission mechanism for transmitting driving force of the internal combustion engine to drive wheels, and an electric motor coupled to the internal combustion engine and capable of outputting driving force to the driving force transmission mechanism.

BACKGROUND ART

Heretofore, in order to improve drivability and riding comfort of a vehicle equipped with an internal combustion engine (hereinafter referred to as "engine") such as a gasoline engine or a diesel engine, and an automatic transmission, it has been required to shorten a shifting time of the automatic transmission. One thing necessary to fulfill the requirement is to reduce inertia (inertial moment) of the engine. In order to reduce the inertia of the engine, it is necessary to make it possible to absorb torque fluctuation of the engine without utilizing the inertia.

Meanwhile, with a view to improving fuel economy of a multi-cylinder engine, there has been proposed a cylinder deactivatable engine configured to stop combustion in a part of the cylinders, depending on an operating load of the engine. In the cylinder deactivatable engine, torque fluctuation during cylinder deactivation operation is larger than that during all-cylinder operation. Thus, in order to expand an engine operating range for performing the cylinder deactivation, so as to further improve fuel economy performance, it is necessary to make it possible to absorb increasing torque fluctuation of the engine.

Further, such torque fluctuation of an engine is transmitted to a floor panel of a passenger compartment via an engine mount and a power train extending from a transmission to a drive shaft, causing noise inside the passenger compartment. Thus, in order to improve quietness inside the passenger compartment, it is necessary to improve performance of absorbing the torque fluctuation of the engine.

In a hybrid automotive vehicle equipped with an electric motor as a drive source (prime mover) in addition to an engine, there has been proposed a driving force output apparatus configured to cause the motor to output a torque so as to suppress torque fluctuation of the engine, i.e., so as to function as a means to absorb torque fluctuation of the engine (see, for example, the following Patent Document 1). This conventional driving force output apparatus is operable to control motors (motor-generators) such that one of the motors functions as a motor to output a positive pulsation torque in conjunction with a pulsation of torque on an output shaft of the engine, and the other motor functions as a generator to generate electric power using an excessive driving force output to a drive shaft, thereby suppressing vibration associated with a pulsation of the engine torque.

PRIOR ART DOCUMENT

Patent Document

Patent Document 1: JP 2006-187168A

SUMMARY OF INVENTION

Technical Problem

However, in the conventional technique described in the Patent Document 1, in order to suppress vibration associated with a pulsation of the engine torque, the motors have to be controlled to function, respectively, as a motor for torque output and a generator for electric power generation, at high frequencies in conjunction with a pulsation of the engine torque, so that a large loss occurs in association with input and output of electric power, and thus energy efficiency of the entire vehicle is deteriorated.

The present invention has been made to solve the above conventional problem, and an object thereof is to provide a hybrid vehicle driving force control method and device capable of effectively absorbing torque fluctuation of an engine while suppressing deterioration in energy efficiency.

Solution to Technical Problem

In order to achieve the above object, the present invention provides a driving force control method for a hybrid vehicle equipped with an internal combustion engine, a driving force transmission mechanism for transmitting driving force of the internal combustion engine to drive wheels, and an electric motor coupled to the internal combustion engine and capable of outputting driving force to the driving force transmission mechanism. The driving force control method comprises the steps of: estimating an average torque output by the internal combustion engine; estimating a torque fluctuation component of the torque output by the internal combustion engine; setting a countertorque for suppressing the estimated torque fluctuation component; and controlling the electric motor to output the set countertorque, wherein the step of setting a countertorque includes: a sub-step of, under a condition that the average torque output by the internal combustion engine is constant, setting a negative control gain such that, as an engine speed of the internal combustion engine becomes higher, an absolute value of the control gain becomes smaller; and a sub-step of setting the countertorque based on a product of the estimated torque fluctuation component and the control gain.

In the driving force control method of the present invention having the above feature, under the condition that the average torque output by the internal combustion engine is constant, the countertorque is set based on a product of the negative control gain which is set such that the absolute value thereof becomes smaller as the engine speed of the internal combustion engine becomes higher, and the estimated torque fluctuation component of the internal combustion engine. Specifically, under the condition that the average torque output by the internal combustion engine is constant, vibration is more easily attenuated in a vibration transmission path extending from the internal combustion engine to a floor panel of a passenger compartment of the vehicle, as the engine speed of the internal combustion engine becomes higher, so that vibration and noise in the floor panel of the passenger compartment is less likely to increase. That is, even if the absolute value of the amplitude of the countertorque (countertorque amplitude) is reduced, vibration and noise in the floor panel of the passenger compartment can be sufficiently suppressed. Therefore, the countertorque is set based on a product of the negative control gain which is set such that the absolute value thereof becomes smaller as the engine speed of the internal combustion engine becomes higher, and the estimated torque fluctuation component of the internal combustion engine. This makes it possible to suppress electric power consumption associated with generation of the countertorque, while sufficiently absorbing torque fluctuation of the internal combustion engine.

Preferably, in the driving force control method of the present invention, the step of setting a countertorque includes a sub-step of, under a condition that the engine speed of the internal combustion engine is constant, setting the control gain such that, as the average torque output by the internal combustion engine becomes larger, the absolute value of the control gain becomes larger.

According to this feature, under the condition that the engine speed of the internal combustion engine is constant, the absolute value of the countertorque to be output by the electric motor becomes larger as the average torque output by the internal combustion engine becomes larger. Specifically, under the condition that the engine speed of the internal combustion engine is constant, the amplitude of the torque fluctuation component becomes larger as the average torque output by the internal combustion engine becomes larger, but the absolute value of the countertorque also becomes larger as the average torque becomes larger, as above, so that it is possible to reliably absorb the torque fluctuation of the internal combustion engine to suppress vibration associated with the torque fluctuation of the internal combustion engine.

Preferably, in the driving force control method of the present invention, the step of setting a countertorque includes a sub-step of, under a condition that the engine speed of the internal combustion engine is constant, setting the control gain such that, as the average torque output by the internal combustion engine becomes larger, the absolute value of the control gain becomes smaller.

According to this feature, under the condition that the engine speed of the internal combustion engine is constant, the absolute value of the countertorque to be output by the electric motor becomes smaller as the average torque output by the internal combustion engine becomes larger. As the average torque output by the internal combustion engine becomes larger, a margin of driving force becomes larger. Thus, in such a region, the engine speed of the internal combustion engine can be raised along with a rise in vehicle speed, so that the frequency of the torque fluctuation component of the internal combustion engine becomes more likely to increase, and the frequency of vibration associated with torque fluctuation of the internal combustion engine becomes more likely to change. In this situation, resonance is less likely to occur in the vibration transmission path extending from the internal combustion engine to the floor panel of the passenger compartment, and the floor panel of the passenger compartment is less likely to be largely vibrated. That is, even if the absolute value of countertorque amplitude is reduced, vibration and noise in the floor panel of the passenger compartment can be sufficiently suppressed. Therefore, the absolute value of the countertorque is set such that it becomes smaller as the average torque output by the internal combustion engine becomes larger. This makes it possible to suppress electric power consumption associated with generation of the countertorque, while sufficiently absorbing torque fluctuation of the internal combustion engine.

The present invention also provides a driving force control device for a hybrid vehicle equipped with an internal combustion engine, a driving force transmission mechanism for transmitting driving force of the internal combustion engine to drive wheels, and an electric motor coupled to the internal combustion engine and capable of outputting driving force to the driving force transmission mechanism. The driving force control device comprises: an average torque estimation part operable to estimate an average torque output by the internal combustion engine; a torque fluctuation component estimation part operable to estimate a torque fluctuation component of the torque output by the internal combustion engine; a countertorque setting part operable to set a countertorque for suppressing the estimated torque fluctuation component; and an electric motor control part operable to control the electric motor to output the set countertorque, wherein the countertorque setting part is operable, under a condition that the average torque output by the internal combustion engine is constant, to set a negative control gain such that, as an engine speed of the internal combustion engine becomes higher, an absolute value of the control gain becomes smaller, and then to set the countertorque based on a product of the estimated torque fluctuation component and the control gain.

Preferably, in the driving force control device of the present invention, the countertorque setting part is operable, under a condition that the engine speed of the internal combustion engine is constant, to set the control gain such that, as the average torque output by the internal combustion engine becomes larger, the absolute value of the control gain becomes larger.

Preferably, in the driving force control device of the present invention, the countertorque setting part is operable, under a condition that the engine speed of the internal combustion engine is constant, to set the control gain such that, as the average torque output by the internal combustion engine becomes larger, the absolute value of the control gain becomes smaller.

Effect of Invention

The hybrid vehicle driving force control method and device of the present invention can effectively absorb torque fluctuation of an engine while suppressing deterioration in energy efficiency.

BRIEF DESCRIPTION OF DRAWINGS

FIG. 1 is a schematic diagram showing the overall configuration of a vehicle employing a driving force control device according to one embodiment of the present invention.

FIG. 2 is a block diagram showing an electrical configuration of the vehicle employing the driving force control device according to this embodiment.

FIG. 3 is a flowchart of driving force control processing to be executed by the driving force control device according to this embodiment.

FIG. 4 is a control block diagram showing a process through which the driving force control device according to this embodiment determines a motor instruction torque.

DESCRIPTION OF EMBODIMENTS

Figure 5:
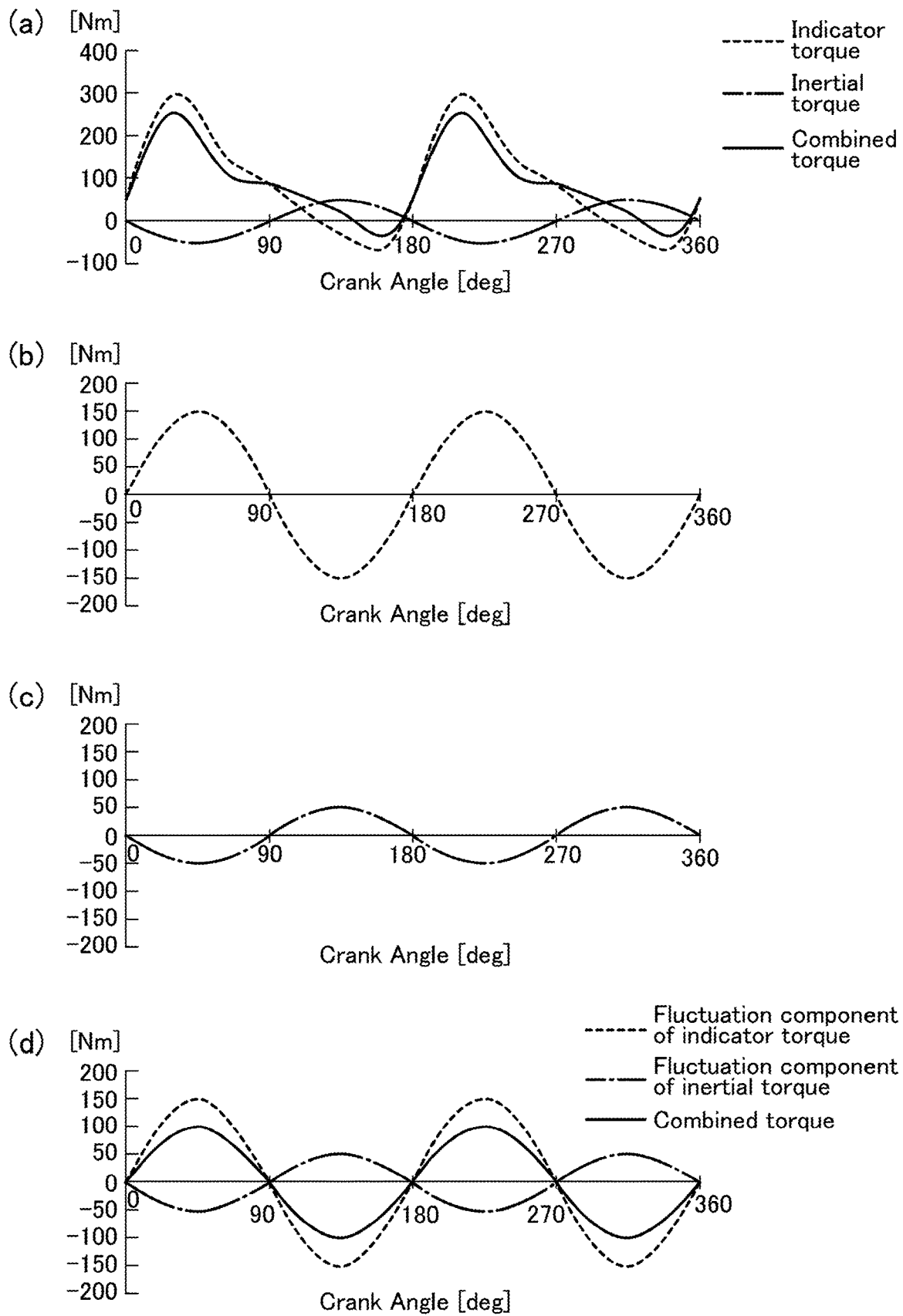
FIG. 5 shows charts representing a fluctuation component of torque on an output shaft of an engine.

With reference to the accompanying drawings, a vehicle driving force control method and device according to one embodiment of the present invention will now be described.

<System Configuration>

First of all, the configuration of a vehicle employing the driving force control device according to this embodiment will be described with reference to FIGS. 1 and 2. FIG. 1 is a schematic diagram showing the overall configuration of the vehicle employing the driving force control device according to this embodiment, and FIG. 2 is a block diagram showing an electrical configuration of the vehicle employing the driving force control device according to this embodiment.

As shown in FIG. 1, the vehicle 1 employing the driving force control device according to this embodiment is a hybrid vehicle equipped with an engine 2 and a motor (motor-generator) 4 each serving as a drive source (prime mover). The engine 2 and the motor 4 are coupled to each other through a non-illustrated clutch for selectively connecting and disconnecting driving force transmission. An automatic transmission 6 is provided on a downstream side of the motor 4 in a driving force transmission path. An output of the automatic transmission 6 is transmitted to right and left drive wheels via a differential unit 8.

Further, the vehicle 1 is equipped with a battery (secondary battery) 10, and an inverter 12 for controlling input and output of electric power between the motor 4 and the battery 10. The inverter 12 is operable to convert a DC power supplied from the battery 10 into an AC power, and supply the AC power to the motor 4, and to convert a regenerative electric power generated by the motor 4 into a DC power, and supply the DC power to the battery 10, thereby charging the battery 10.

Further, the vehicle 1 is equipped with a PCM (driving force control device) 14 for controlling the engine 2 and simultaneously controlling the motor 4 through the inverter 12, and a TCM (Transmission Control Module) 16 for controlling the automatic transmission 6.

As shown in FIG. 2, the vehicle 1 is provided with plural sensors for detecting a driving state of the vehicle 1 which changes from moment to moment. Specifically, these sensors are as follows. An accelerator position sensor 18 is operable to detect an accelerator position which is a relative position of an accelerator pedal (which is equivalent to an amount of movement of accelerator pedal depressed by a driver). A vehicle speed sensor 20 is operable to detect a vehicle speed of the vehicle 1. A crank angle sensor 22 is operable to detect a crank angle of a crankshaft of the engine 2. An airflow sensor 24 is operable to detect an intake air amount which is equivalent to the flow rate of intake air passing through an intake passage of the engine 2. A motor angle sensor 26 is operable to detect a rotational angle of a rotor of the motor 4. These sensors are operable to output detection signals S118, S120, S122, S124, A126 each corresponding to a respective one of the detected parameters, to the PCM 14.

Further, various kinds of information about the automatic transmission 6 of the vehicle 1 (e.g., a current one of plural speed stages, whether or not the driving state reaches a shift point at which a shift is to be executed, and an engine speed at a time when the current speed stage is shifted to the next speed stage) are input into the PCM 14 from the TCM 16 for controlling the automatic transmission 6.

The PCM 14 is operable, based on the detection signals S118 to S126 input from the various sensors, and the various kinds of information about the automatic transmission 6 input from the TCM 16, to perform control for the engine 2 and the inverter 12. Specifically, as shown in FIG. 2, the PCM 14 is operable to: supply a control signal S128 to a throttle valve unit 28 to control an opening-closing timing and an opening degree of a throttle valve; supply a control signal S130 to a fuel injector 30 to control a fuel injection amount and a fuel injection timing; supply a control signal S132 to an ignition unit 32 to control an ignition timing; supply a control signal S134 to an intake-exhaust valve mechanism 34 to control operation timings of intake and exhaust valves of the engine 2; and supply a control signal S112 to the inverter 12 to control the input and output of electric power between the motor 4 and the battery 10.

The PCM 14 is composed of a computer which comprises: a CPU; various programs (including a basic control program such as an OS, and an application program capable of being activated on the OS to realize a specific function) to be interpreted and executed by the CPU; and an internal memory such as ROM or RAM for storing therein the programs and a variety of data.

The PCM 14 configured as above is equivalent to "driving force control device" set forth in the appended claims, and functions as "average torque estimation part", "torque fluctuation component estimation part", "countertorque setting part", and "electric motor control part" set forth in the appended claims.

<Driving Force Control>

Next, with reference to FIG. 3, driving force control to be executed in this embodiment will be described. FIG. 3 is a flowchart of driving force control processing to be executed by the driving force control device according to this embodiment.

The driving force control processing shown in FIG. 3 is activated when an ignition switch of the vehicle 1 is turned on and thus electric power is supplied to the PCM 14, and repeatedly executed in a given cycle period. Upon start of the driving force control processing, in step S1, the PCM 14 operates to acquire various kinds of information about the driving state of the vehicle 1. Specifically, the PCM 14 operates to acquire a current value of the accelerator position detected by the accelerator position sensor 18, a current value of the vehicle speed detected by the vehicle speed sensor 20, a current value of the crank angle detected by the crank angle sensor 22, a current value of the intake air amount detected by the airflow sensor 24, a current value of the rotational angle of the rotor of the motor 4 detected by the motor angle sensor 26, a current one of the gear stages of the automatic transmission 6 input from the TCM 16, etc.

Subsequently, in step S2, the PCM 14 operates to set a target acceleration, based on the driving state of the vehicle 1 detected in the step S1. Specifically, the PCM 14 operates to select, from among a plurality of acceleration characteristic maps each defining a relationship between an acceleration (vehicle acceleration) and the accelerator position, with respect to various values of the vehicle speed and the plural speed stages (the maps are preliminarily created and stored in a memory or the like), one acceleration characteristic map corresponding to a current value of the vehicle speed and a current one of the speed stages. Then, the PCM 14 operates to refer to the selected acceleration characteristic map to set, as a target acceleration, a value of the acceleration corresponding to a current value of the accelerator position detected by the accelerator position sensor 18.

Subsequently, in step S3, the PCM 14 operates to set a target engine torque and a target motor torque which are necessary to realize the target acceleration set in the step S2 based on the driving state detected in the step S1.

Specifically, the PCM 14 operates to set a target value of a combined torque of the engine 2 and the motor 4, based on current values of the vehicle speed, road grade, road surface µ, a current one of the speed stages, etc. Further, the PCM 14 operates to refer to a fuel consumption rate characteristic map defining a relationship between an engine torque and the engine speed which allows a fuel consumption rate to become minimum (the map is preliminarily created and stored in a memory or the like), to set, as the target engine torque, a value of the engine torque corresponding to a current value of the engine speed calculated based on the crank angle acquired in the step S1. Then, the PCM 14 operates to set, as the target motor torque, a value obtained by subtracting the target engine torque from the target value of the combined torque.

For example, in a situation where the target value of the combined torque is greater than the target engine torque, the target motor torque is set to a positive value. That is, the engine 2 is operated in a region where the fuel consumption rate is relatively low, and a deficient torque is covered by the motor 4, so that it is possible to output a torque necessary to realize the target acceleration.

On the other hand, in a situation where the target value of the combined torque is less than the target engine torque, the target motor torque is set to a negative value. That is, the engine 2 is operated in a region where the fuel consumption rate is relatively low, and an excess torque is utilized for electric power generation by the motor 4 to charge the battery 10, so that it is possible to output a torque necessary to realize the target acceleration, while efficiently charging the battery 10.

Subsequently, in step S4, the PCM 14 operates to determine control values of plural actuators of the engine 2 (e.g., the ignition unit 32, the throttle valve unit 23 and the intake-exhaust valve mechanism 34) for realizing the target engine torque set in the step S3 based in the driving state detected in the step S1.

Specifically, the PCM 14 operates to: calculate a target indicated torque based on the target engine torque and by additionally taking into consideration a loss torque due to friction loss and pumping loss; select, among a plurality of ignition advance maps each defining a relationship between the ignition timing and an indicated torque, with respect to various values of charging efficiency and various values of the vehicle speed (the maps are preliminarily created and stored in a memory or the like), one ignition advance map which corresponds to a current value of the engine speed and in which the target indicated torque is obtained at an ignition timing falling within a range free of occurrence of knocking (on a retard side with respect to a knock limit ignition timing preliminarily set in each of the ignition advance maps) and possibly close to MBT (Minimum Advance for Best Torque); and refer to the selected ignition advance map to set, as the control value of the ignition unit 32, a value of the ignition timing corresponding to the target indicated torque.

Further, the PCM 14 operates to derive a heat amount necessary to output the target indicated torque (desired torque), and set, as a target charging efficiency, a value of the charging efficiency necessary to generate the desired torque. Then, the PCM 14 operates to set the opening degree of the throttle valve of the throttle valve unit 28, and opening and closing timings of the intake valves through the intake-exhaust valve mechanism 34, while taking into account the intake air amount detected by the airflow sensor 24, so as to enable air equivalent to the set target charging efficiency to be introduced into the engine 10.

Subsequently, in step S5, the PCM 14 operates to determine, based on the driving state detected in the step S1, the target motor torque set in the step S3, and the control values of the actuators of the engine 2 set in the step S4, a torque to be output by the motor 4 (motor instruction torque), specifically a control value of the input and output of electric power between the motor 4 and the battery 10.

Here, with reference to FIGS. 4 and 5, a process through which the PCM 14 determines the motor instruction torque will be described. FIG. 4 is a control block diagram showing a process through which the driving force control device according to this embodiment determines the motor instruction torque. FIG. 5 shows charts representing a fluctuation component of torque on an output shaft of the engine 2, wherein: a chart at (a) represents a fluctuation in the torque on the output shaft of the engine 2; a chart at (b) represents a sub-component of the torque fluctuation component arising from a change in the pressure of in-cylinder combustion gas; a chart at (c) represents another sub-component of the torque fluctuation component arising from inertia of a reciprocating mass inside the engine 2; a chart at (d) represents a combined torque fluctuation component of the sub-component arising from a change in the pressure of in-cylinder combustion gas and the sub-component arising from inertia of the reciprocating mass inside the engine 2. In each of the charts shown in FIG. 5, the horizontal axis denotes the crank angle (deg), and the vertical axis denotes the torque (Nm).

As shown in FIG. 4, the PCM 14 comprises: an average engine torque estimation part 36 for estimating an average torque (average engine torque) output by the engine 2 in one combustion cycle; a torque fluctuation component estimation part 38 for estimating a fluctuation component of torque (torque fluctuation component) on the output shaft of the engine 2; and a motor instruction torque determination part 40 for determining a torque to be output by the motor 4 (motor instruction torque).

The average engine torque estimation part 36 is configured to receive, as an input, the intake air amount and the crank angle acquired in the step S1. The average engine torque estimation part 36 is operable to: estimate the charging efficiency based on the intake air amount acquired in the step S1; derive a value of the indicated torque corresponding to a heat amount to be generated when air is introduced into a combustion chamber of the engine 2 with the estimated charging efficiency; and estimate the average engine torque by subtracting a loss torque due to friction loss and pumping loss from the calculated indicated torque. Further, the average engine torque estimation part 36 is operable to calculate the engine speed based on the crank angle acquired in the step S1.

The torque fluctuation component estimation part 38 is operable to estimate the torque fluctuation component, based on the average engine torque estimated by the average engine torque estimation part 36, the engine speed calculated by the average engine torque estimation part 36, and the crank angle acquired in the step S1.

As represented in the chart at (a) of FIG. 5, the torque on the output shaft of the engine 2 (which is indicated by the solid line in FIG. 5) can be separated into a torque arising from a change in the pressure of in-cylinder combustion gas (i.e., an indicator torque, which is indicated by the broken line in FIG. 5), and a torque arising from inertia of the reciprocating mass (a piston, a connecting rod, etc.) inside the engine 2 (i.e., an inertial torque, which is indicated by the one-dot chain line in FIG. 5).

In the above two torques, a fluctuation of the indicator torque is expressed as a vibration obtained by combining a sine vibration (so-called "secondary vibration") having a cycle of 180 degrees crank angle (CA), and higher-order vibrations, wherein the most problematic vibration component in vibration transmission to a floor panel of a passenger compartment of the vehicle or the like is the secondary vibration. When extracting a secondary vibration component in a fluctuation of the indicator torque on the basis of the average engine torque, a sine vibration having a cycle of 180 degrees CA is obtained as a torque fluctuation component arising from the fluctuation of the indicator torque (indicator torque fluctuation component), as represented in the chart at (b). The amplitude of the indicator torque fluctuation component can be expressed as a function of the average engine torque. Specifically, it increases in proportion to an increase in the average engine torque.

Further, as represented in the chart at (c), a torque fluctuation component arising from a fluctuation of the inertial torque (inertial torque fluctuation component) is expressed as a sine vibration having a phase opposite to that of the indicator torque fluctuation component represented in the chart at (b). The amplitude of the inertial torque fluctuation component can be expressed as a function of the engine speed. Specifically, it becomes larger as the engine speed becomes higher.

As represented in the chart at (d), a torque fluctuation component of the engine 2 is expressed as a sine vibration having a cycle of 180 degrees CA, which is obtained by combining the indicator torque fluctuation component represented in the chart at (b) and the inertial torque fluctuation component represented in the chart at (c). The amplitude of the indicator torque fluctuation component is expressed as the function of the average engine torque, and the amplitude of the inertial torque fluctuation component is expressed as the function of the engine speed, as mentioned above, so that the amplitude of the torque fluctuation component of the engine 2 obtained by combining the two fluctuation components can be expressed as a function $A_{tr}$ (Te, Ne) of the average engine torque Te and the engine speed Ne. Therefore, the torque fluctuation component of the engine 2 is expressed as a sine function $A_{tr}$ (Te, Ne) Sin (CA), where the crank angle CA is a variable, and $A_{tr}$ (Te, Ne) is the amplitude thereof.

The torque fluctuation component estimation part 38 is operable to assign the crank angle CA acquired in the step S1, the average engine torque Te estimated by the average engine torque estimation part 36, and the engine speed Ne calculated by the average engine torque estimation part 36, to the sine function $A_{tr}$ (Te, Ne)×Sin (CA) described in connection with the chart at (d), thereby estimating the torque fluctuation component.

As shown in FIG. 4, in addition to the motor angle acquired in the step S1 and the target motor torque set in the step S3, a value obtained by multiplying the torque fluctuation component estimated by the torque fluctuation component estimation part 38, by a given control gain ("K" in FIG. 4) is input as a countertorque into the motor instruction torque determination part 40. This control gain K is a gain (countertorque control gain) set to cause the motor 4 to output a countertorque capable of effectively absorbing the torque fluctuation of the engine 2 while suppressing deterioration in energy efficiency. The PCM 14 is operable, depending on the driving state detected in the step S1 and the target engine torque set in the step S3, to set the control gain K to a value falling within the following range: $-1 \leq K \leq 0$. That is, as the countertorque, a signal having a phase opposite to that of the torque fluctuation component of the engine 2 and having an amplitude equal to or less than that of the torque fluctuation component of the engine 2 is input into the motor instruction torque determination part 40. The details of the countertorque control gain will be described later.

The motor instruction torque determination part 40 is operable to determine the motor instruction torque, based on the motor angle acquired in the step S1, the target motor torque set in the step S3, and the countertorque. Specifically, the motor instruction torque determination part 40 is operable to determine a total of the target motor torque set in the step S3 and the countertorque, as the motor instruction torque at the motor angle corresponding to the crank angle CA acquired in the step S1, and output the determined motor instruction torque to the inverter 12.

Returning to FIG. 3, after determination of the motor instruction torque in the step S5, the processing routine proceeds to step S6. In the step S6, the PCM 14 operates to control the throttle valve unit 28 and the intake-exhaust valve mechanism 34, based on the engine actuator control values determined in the step S4, and control the fuel injector 30, based on a target equivalent ratio determined according to an operating state of the engine 2, etc., and an actual intake air amount estimated based on the detection signal S124 of the airflow sensor 24, etc. Further, the PCM 14 operates to control the input and output of electric power between the motor 4 and the battery 10 through the inverter 12, such that the motor 4 outputs the motor instruction torque determined in the step S5. After the step S6, the PCM 14 completes one cycle of driving force control processing.

<Setting of Countertorque Control Gain>

Next, setting of the countertorque control gain by the PCM 14 will be described based on FIGS. 6 to 9.

Figure 6A:
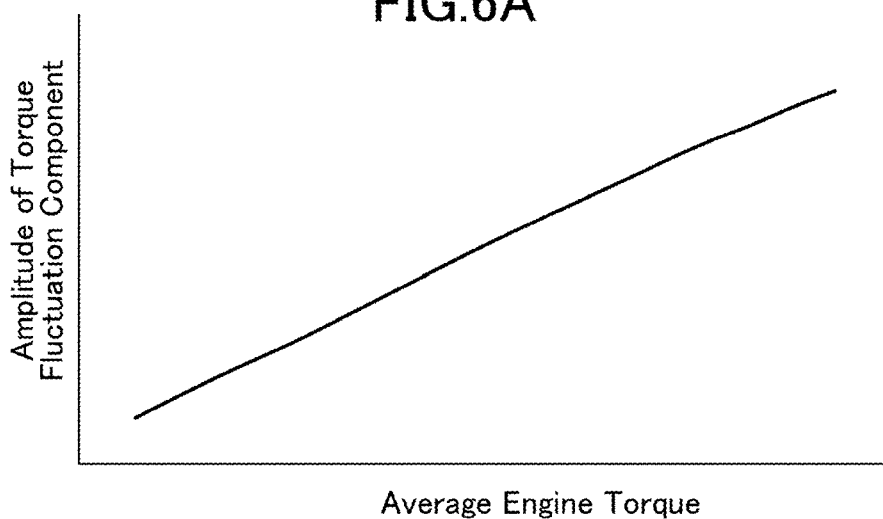
FIG. 6A is a chart representing a relationship between an average engine torque and a countertorque, under the condition that an engine speed is constant.
Figure 6B:
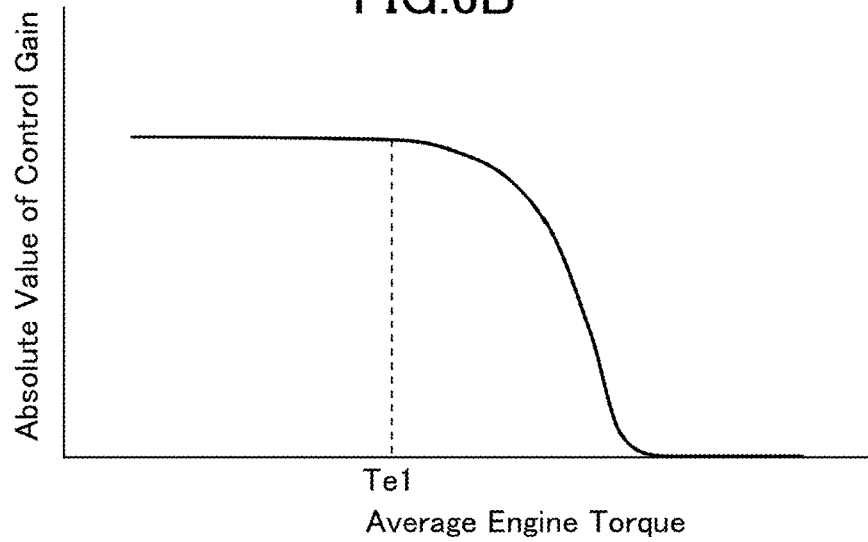
FIG. 6B is a chart representing the relationship between the average engine torque and the countertorque, under the condition that the engine speed is constant.
Figure 6C:
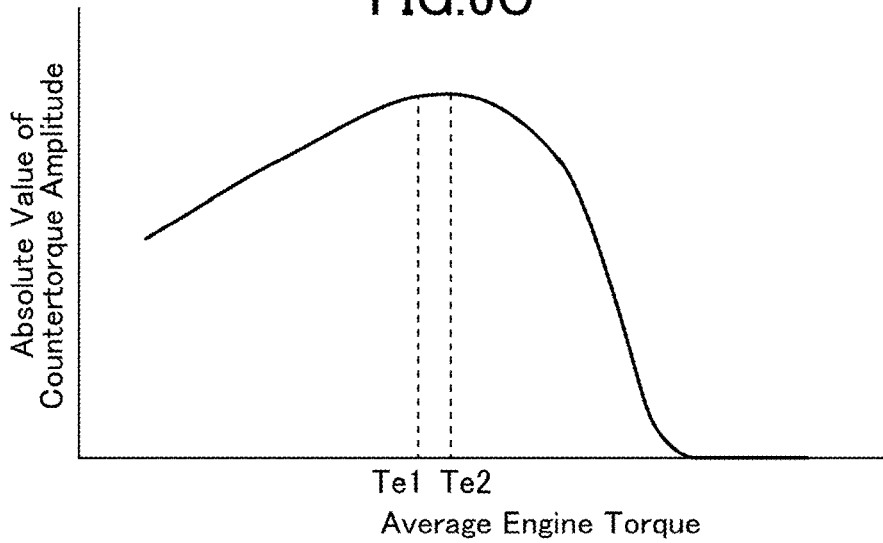
FIG. 6C is a chart representing the relationship between the average engine torque and the countertorque, under the condition that the engine speed is constant.

FIGS. 6A to 6C are charts representing a relationship between the average engine torque estimated by the average engine torque estimation part 36 and the countertorque, under the condition that the engine speed is constant, wherein: FIG. 6A is a chart representing a relationship between the average engine torque estimated by the average engine torque estimation part 36 and the amplitude of the torque fluctuation component of the engine 2; FIG. 6B is a chart representing a relationship between the average engine torque estimated by the average engine torque estimation part 36 and the absolute value of the control gain ("K" in FIG. 4); and FIG. 6C is a chart representing a relationship between the average engine torque estimated by the average engine torque estimation part 36 and the absolute value of the amplitude of the countertorque (countertorque amplitude).

As mentioned above, the torque fluctuation component on the output shaft of the engine 2 is obtained by combining the indicator torque fluctuation component and the inertial torque fluctuation component. The amplitude of the indicator torque fluctuation component can be expressed as the function of the average engine torque. Specifically, it increases in proportion to an increase in the average engine torque. Further, the amplitude of the inertial torque fluctuation component can be expressed as the function of the engine speed. Specifically, it becomes larger as the engine speed becomes higher. Therefore, as shown in FIG. 6A, under the condition that the engine speed is constant, the amplitude of the torque fluctuation component of the engine 2 increases in proportion to an increase in the average engine torque estimated by the average engine torque estimation part 36.

In this case, as shown in FIG. 6B, when the average engine torque estimated by the average engine torque estimation part 36 is in the range of less than a given value Te1, the absolute value of the control gain ("K" in FIG. 4) is set to a constant value (specifically, 1), and, on the other hand, when the average engine torque is in the range of equal to or greater than the given value Te1, the absolute value of the control gain is set such that it becomes smaller as the average engine torque becomes larger.

Thus, as shown in FIG. 6C, when the average engine torque estimated by the average engine torque estimation part 36 is in the range of equal to or less than the given value Te1, the absolute value of the countertorque amplitude becomes larger as the average engine torque becomes larger. On the other hand, when the average engine torque estimated by the average engine torque estimation part 36 becomes greater than the given value Te1, the rate of increase in the absolute value of the countertorque amplitude becomes gentler as the absolute value of the control gain ("K" in FIG. 4) becomes smaller along with an increase in the average engine torque. Then, when the average engine torque reaches a given value Te2, the absolute value of the countertorque amplitude becomes maximum. Further, when the average engine torque estimated by the average engine torque estimation part 36 is in the range of greater than the given value Te2, the absolute value of the countertorque amplitude becomes smaller as the average engine torque becomes larger.

More specifically, the amplitude of the torque fluctuation component becomes larger as the average engine torque becomes larger. In this situation, when the average engine torque is in the range of equal to or less than the given value Te1, the absolute value of the countertorque amplitude also becomes larger as the average engine torque estimated by the average engine torque estimation part 36 becomes larger, so that it is possible to reliably absorb the torque fluctuation component of the engine 2 by the countertorque, thereby suppressing vibration associated with the torque fluctuation of the engine 2.

Further, when the average engine torque estimated by the average engine torque estimation part 36 is around the given value Te2, a driving force from the engine 2 balances to a traveling resistance of the vehicle 1 and thus the vehicle speed is less likely to change, so that a change in the engine speed is relatively small and thus the frequency of the torque fluctuation component of the engine 2 is less likely to change. In this situation, because the frequency of the torque fluctuation component of the engine 2 is less likely to change, resonance is more likely to occur in a vibration transmission path extending from the engine 2 to the floor panel of the passenger compartment, and the floor panel of the passenger compartment is more likely to be largely vibrated. Therefore, the absolute value of the countertorque amplitude is maximized around the given value Te2. This makes it possible to reliably absorb the torque fluctuation component of the engine 2 by the countertorque, thereby suppressing vibration associated with the torque fluctuation of the engine 2.

Further, when the average engine torque is in the range of greater than the given value Te2, a margin of the driving force from the engine 2 becomes larger as the average engine torque becomes larger, so that the vehicle speed can be easily raised. Thus, in such a range, the engine speed can be raised along with a rise in the vehicle speed, so that the frequency of the torque fluctuation component of the engine 2 is more likely to increase. In this situation, the frequency of vibration associated with the torque fluctuation of the engine 2 is more likely to change, so that resonance is less likely to occur in the vibration transmission path extending from the engine 2 to the floor panel of the passenger compartment, and the floor panel of the passenger compartment is less likely to be largely vibrated. That is, even if the absolute value of the countertorque amplitude is reduced, vibration and noise in the floor panel of the passenger compartment can be sufficiently suppressed. Therefore, the absolute value of the countertorque amplitude is set such that it becomes smaller as the average engine torque estimated by the average engine torque estimation part 36 becomes larger. This makes it possible to suppress electric power consumption associated with generation of the countertorque, while sufficiently absorbing the torque fluctuation of the engine 2.

Figure 7A:
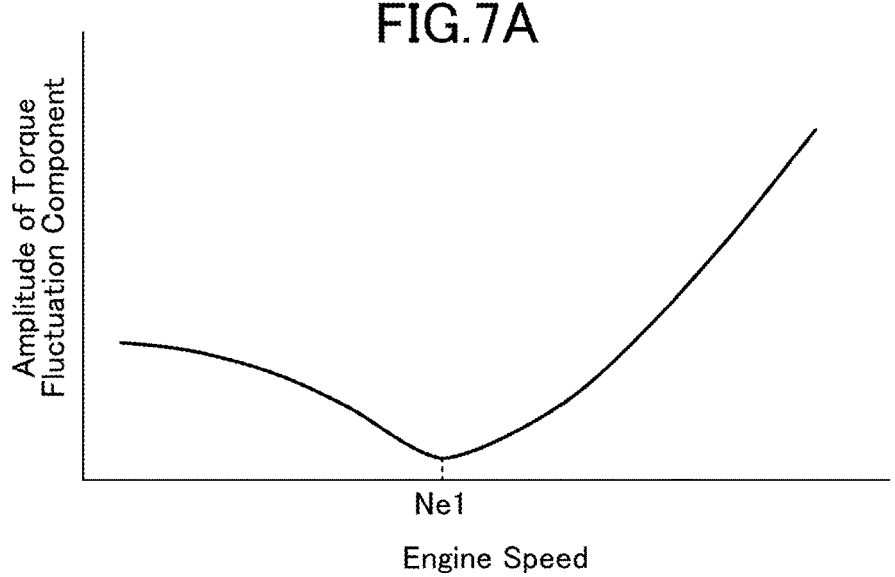
FIG. 7A is a chart representing the relationship between the engine speed and the countertorque, under the condition that the average engine torque is constant.
Figure 7B:
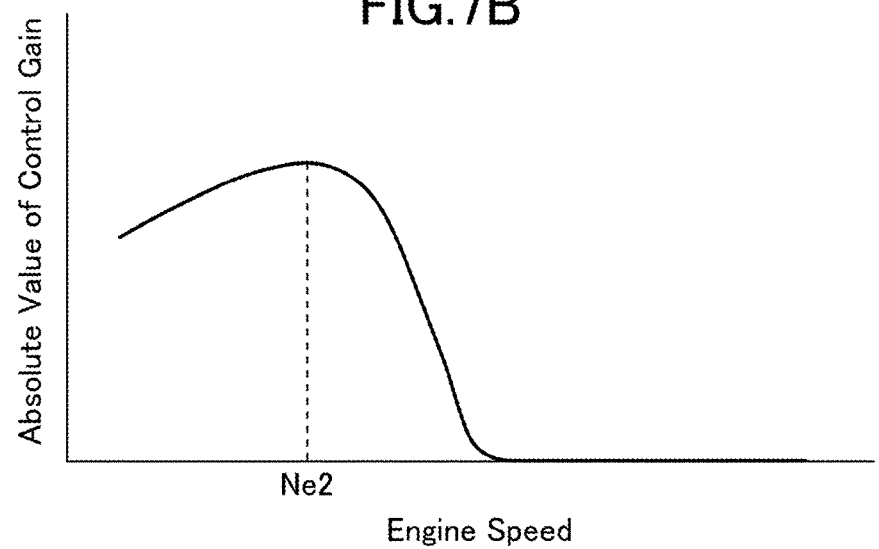
FIG. 7B is a chart representing the relationship between the engine speed and the countertorque, under the condition that the average engine torque is constant.
Figure 7C:
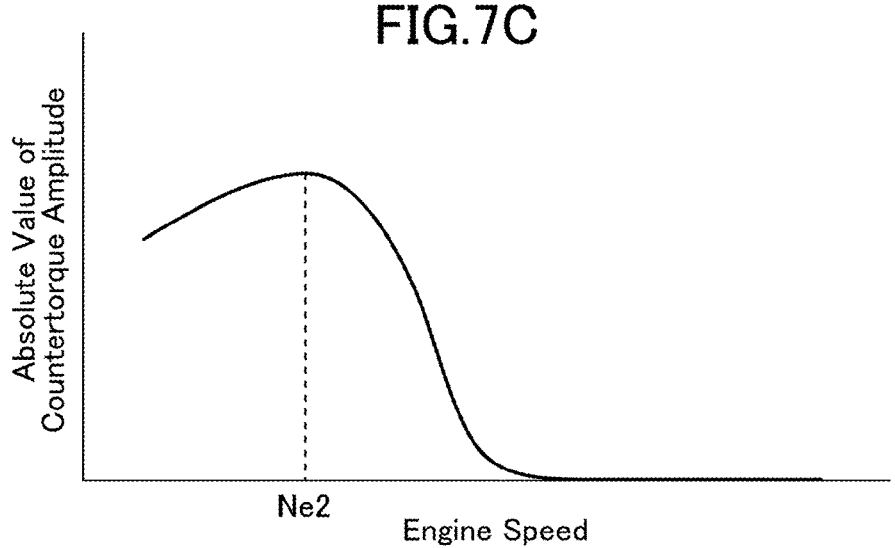
FIG. 7C is a chart representing the relationship between the engine speed and the countertorque, under the condition that the average engine torque is constant.

FIGS. 7A to 7C are charts representing a relationship between the engine speed calculated by the average engine torque estimation part 36 and the countertorque, under the condition that the average engine torque is constant, wherein: FIG. 7A is a chart representing a relationship between the engine speed calculated by the average engine torque estimation part 36 and the amplitude of the torque fluctuation component of the engine 2; FIG. 7B is a chart representing a relationship between the engine speed calculated by the average engine torque estimation part 36 and the absolute value of the control gain ("K" in FIG. 4); and FIG. 7C is a chart representing a relationship between the engine speed calculated by the average engine torque estimation part 36 and the absolute value of the countertorque amplitude.

As mentioned above, the torque fluctuation component on the output shaft of the engine 2 is obtained by combining the indicator torque fluctuation component, and the inertial torque fluctuation component having a phase opposite to that of the indicator torque fluctuation component. The amplitude of the indicator torque fluctuation component can be expressed as the function of the average engine torque. Specifically, it increases in proportion to an increase in the average engine torque. Further, the amplitude of the inertial torque fluctuation component can be expressed as the function of the engine speed. Specifically, it becomes larger as the engine speed becomes higher. Therefore, as shown in FIG. 7A, under the condition that the average engine torque estimated by the average engine torque estimation part 36 is constant, when the engine speed calculated by the average engine torque estimation part 36 is in the range of less than a given value Ne1 at which the amplitude of the indicator torque fluctuation component is coincident with the amplitude of the inertial torque fluctuation component, the amplitude of the torque fluctuation component of the engine 2 becomes smaller as the engine speed calculated by the average engine torque estimation part 36 becomes higher, and, on the other hand, when the engine speed calculated by the average engine torque estimation part 36 is in the range of equal to or greater than the given value Ne1 at which the amplitude of the indicator torque fluctuation component is coincident with the amplitude of the inertial torque fluctuation component, the amplitude of the torque fluctuation component of the engine 2 becomes larger as the engine speed calculated by the average engine torque estimation part 36 becomes higher.

In this case, as shown in FIG. 7B, when the engine speed calculated by the average engine torque estimation part 36 is in the range of less than a given value Ne2, the absolute value of the control gain ("K" in FIG. 4) is set such that it becomes larger as the engine speed becomes higher, and, on the other hand, when the engine speed calculated by the average engine torque estimation part 36 is in the range of equal to or greater than the given value Ne2, the absolute value of the control gain is set such that it becomes smaller as the engine speed becomes higher.

Thus, as shown in FIG. 7C, when the engine speed calculated by the average engine torque estimation part 36 is in the range of less than the given value Ne2, the absolute value of the countertorque amplitude becomes larger as the engine speed becomes higher. Then, when the engine speed calculated by the average engine torque estimation part 36 reaches around the given value Ne2, the absolute value of the countertorque amplitude becomes maximum. Further, when the engine speed calculated by the average engine torque estimation part 36 is in the range of greater than the given value Ne2, the absolute value of the countertorque amplitude becomes smaller as the engine speed becomes higher.

More specifically, when the engine speed is in the range of less than the given value Ne2, a margin of the driving force from the engine 2 is relatively large, so that the vehicle speed can be easily raised. Thus, in such a range, the engine speed can be raised along with a rise in the vehicle speed, so that the frequency of the torque fluctuation component of the engine 2 is more likely to increase. In this situation, the frequency of vibration associated with the torque fluctuation of the engine 2 is more likely to change, so that resonance is less likely to occur in the vibration transmission path extending from the engine 2 to the floor panel of the passenger compartment, and the floor panel of the passenger compartment is less likely to be largely vibrated. That is, even if the absolute value of the countertorque amplitude is reduced, vibration and noise in the floor panel of the passenger compartment can be sufficiently suppressed. Therefore, the absolute value of the countertorque amplitude is set such that it becomes smaller as the engine speed calculated by the average engine torque estimation part 36 becomes lower. This makes it possible to suppress electric power consumption associated with generation of the countertorque, while sufficiently absorbing the torque fluctuation of the engine 2.

Further, when the engine speed calculated by the average engine torque estimation part 36 is around the given value Ne2, the engine speed is close to a resonance frequency of the vibration transmission path extending from the engine 2 to the floor panel of the passenger compartment, so that resonance is more likely to occur in the vibration transmission path extending from the engine 2 to the floor panel of the passenger compartment, and the floor panel of the passenger compartment is more likely to be largely vibrated.

Therefore, the absolute value of the countertorque amplitude is maximized around the given value Ne2. This makes it possible to reliably absorb the torque fluctuation component of the engine 2 by the countertorque, thereby suppressing vibration associated with the torque fluctuation of the engine 2.

Further, when the engine speed is in the range of greater than the given value Ne2, vibration is more easily attenuated in the vibration transmission path extending from the engine 2 to the floor panel of the passenger compartment, as the engine speed becomes higher, so that vibration and noise in the floor panel of the passenger compartment is less likely to increase. That is, even if the absolute value of the countertorque amplitude is reduced, vibration and noise in the floor panel of the passenger compartment can be sufficiently suppressed. Therefore, the absolute value of the countertorque amplitude is set such that it becomes smaller as the engine speed calculated by the average engine torque estimation part 36 becomes higher. This makes it possible to suppress electric power consumption associated with generation of the countertorque, while sufficiently absorbing the torque fluctuation of the engine 2.

Figure 8A:
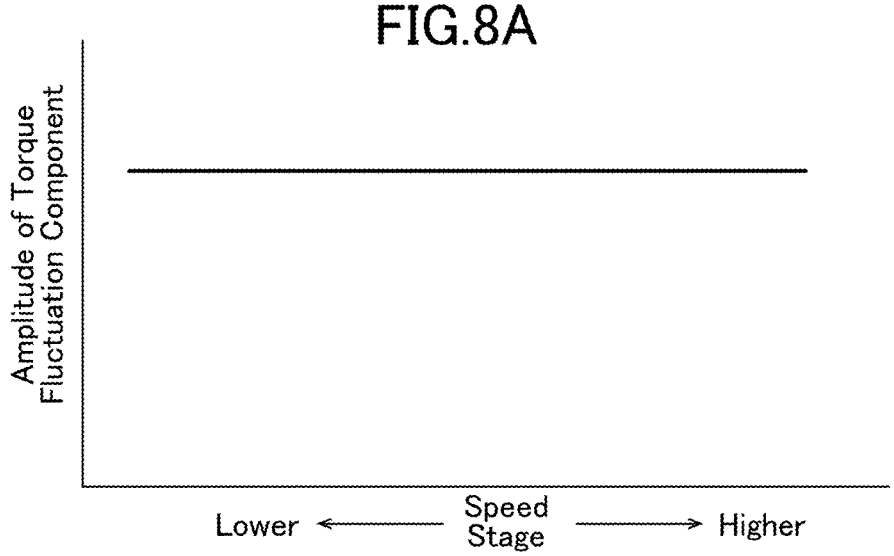
FIG. 8A is a chart representing a relationship between a speed stage of an automatic transmission and the countertorque, under the condition that the average engine torque and the engine speed are constant.
Figure 8B:
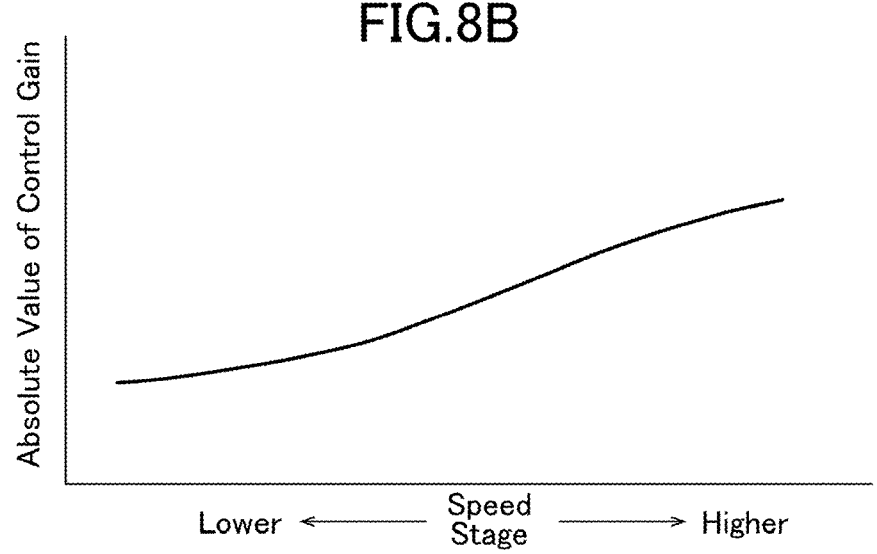
FIG. 8B is a chart representing the relationship between the speed stage of the automatic transmission and the countertorque, under the condition that the average engine torque and the engine speed are constant.
Figure 8C:
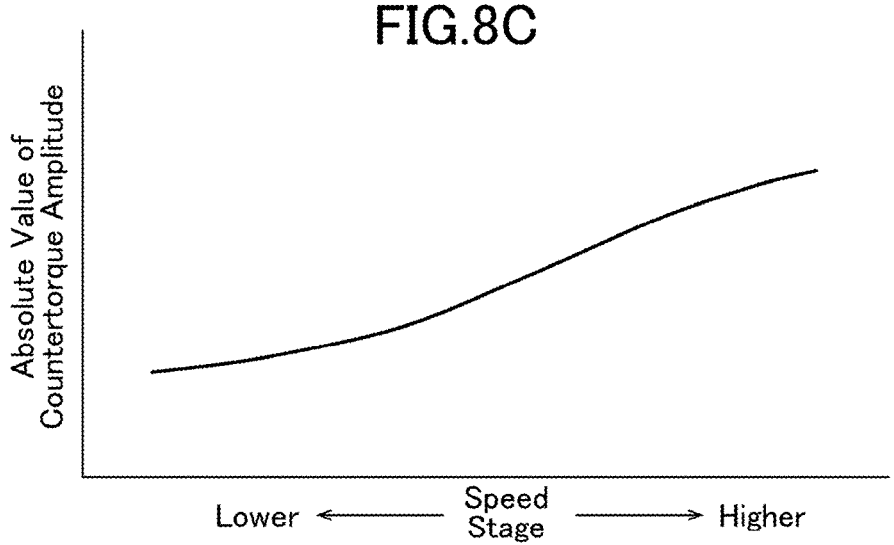
FIG. 8C is a chart representing the relationship between the speed stage of the automatic transmission and the countertorque, under the condition that the average engine torque and the engine speed are constant.

FIGS. 8A to 8C are charts representing a relationship between the speed stage of the automatic transmission 6 of the vehicle 1 input from the TCM 16 into the PCM 14 and the countertorque, under the condition that the average engine torque and the engine speed are constant, wherein: FIG. 8A is a chart representing a relationship between the speed stage input from the TCM 16 into the PCM 14 and the amplitude of the torque fluctuation component of the engine 2; FIG. 8B is a chart representing a relationship between the speed stage input from the TCM 16 into the PCM 14 and the absolute value of the control gain ("K" in FIG. 4); and FIG. 8C is a chart representing a relationship between the speed stage input from the TCM 16 into the PCM 14 and the absolute value of the countertorque amplitude.

As mentioned above, the torque fluctuation component on the output shaft of the engine 2 is obtained by combining the indicator torque fluctuation component, and the inertial torque fluctuation component having a phase opposite to that of the indicator torque fluctuation component. Therefore, as shown in FIG. 8A, under the condition that the average engine torque and the engine speed are constant, the amplitude of the torque fluctuation component of the engine 2 is constant, irrespective of whether the speed stage input from the TCM 16 into the PCM 14 is high or low.

In this case, as shown in FIG. 8B, the absolute value of the control gain ("K" in FIG. 4) is set such that it becomes larger as the speed stage of the vehicle 1 input from the TCM 16 into the PCM 14 becomes higher (i.e., a speed reduction ratio becomes lower).

Thus, as shown in FIG. 8C, the absolute value of the countertorque amplitude becomes larger as the speed stage of the vehicle 1 input from the TCM 16 into the PCM 14 becomes higher, and the absolute value of the countertorque amplitude becomes smaller as the speed stage of the vehicle 1 input from the TCM 16 into the PCM 14 becomes lower.

More specifically, as the speed stage of the vehicle 1 becomes lower, a margin of the driving force from the engine 2 becomes larger, and the vehicle speed can be more easily raised. Thus, the engine speed can be raised along with a rise in the vehicle speed, so that the frequency of the torque fluctuation component of the engine 2 is more likely to increase. In this situation, the frequency of vibration associated with the torque fluctuation of the engine 2 is more likely to change, so that resonance is less likely to occur in the vibration transmission path extending from the engine 2 to the floor panel of the passenger compartment, and the floor panel of the passenger compartment is less likely to be largely vibrated. That is, even if the absolute value of the countertorque amplitude is reduced, vibration and noise in the floor panel of the passenger compartment can be sufficiently suppressed. Therefore, the absolute value of the countertorque amplitude is set such that it becomes smaller as the speed stage of the vehicle 1 input from the TCM 16 into the PCM 14 becomes lower. This makes it possible to suppress electric power consumption associated with generation of the countertorque, while sufficiently absorbing the torque fluctuation of the engine 2.

Figure 9A:
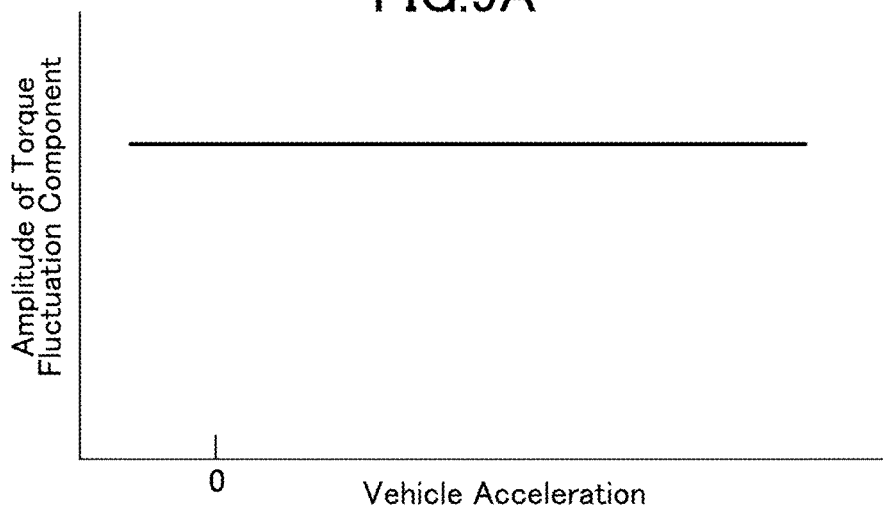
FIG. 9A is a chart representing a relationship between a vehicle acceleration and the countertorque, under the condition that the average engine torque and the engine speed are constant.
Figure 9B:
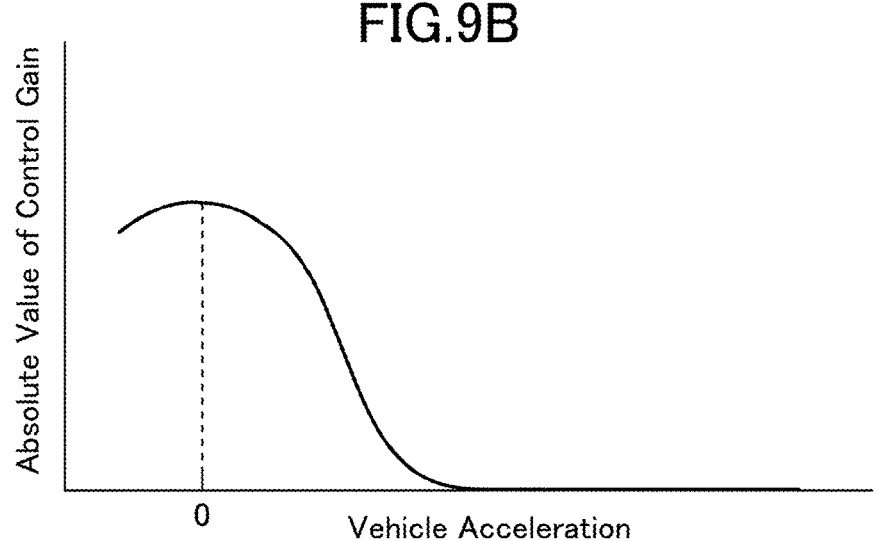
FIG. 9B is a chart representing the relationship between the vehicle acceleration and the countertorque, under the condition that the average engine torque and the engine speed are constant.
Figure 9C:
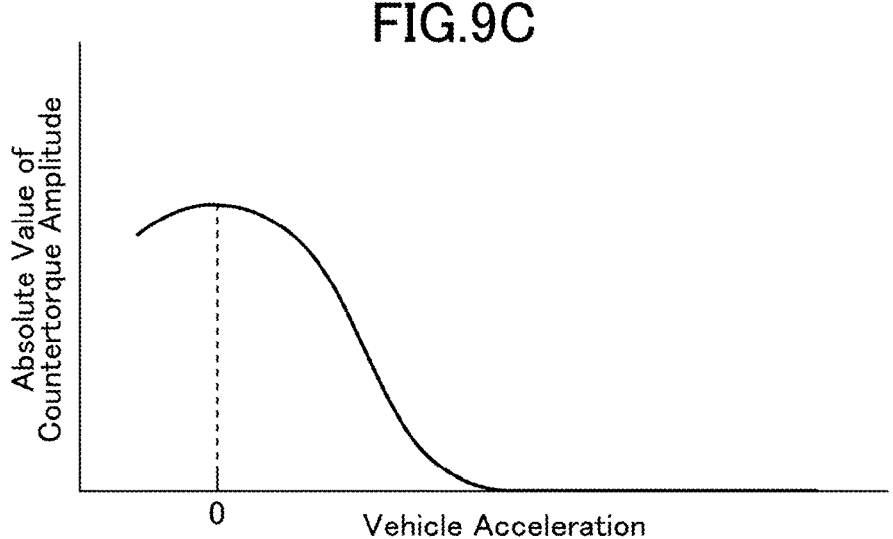
FIG. 9C is a chart representing the relationship between the vehicle acceleration and the countertorque, under the condition that the average engine torque and the engine speed are constant.

FIGS. 9A to 9C are charts representing a relationship between the vehicle acceleration of the vehicle 1 and the countertorque, under the condition that the average engine torque and the engine speed are constant, wherein: FIG. 9A is a chart representing a relationship between the vehicle acceleration and the amplitude of the torque fluctuation component of the engine 2; FIG. 9B is a chart representing a relationship between the vehicle acceleration and the absolute value of the control gain ("K" in FIG. 4); and FIG. 9C is a chart representing a relationship between the vehicle acceleration and the absolute value of the countertorque amplitude. The vehicle acceleration of the vehicle 1 is set as the target acceleration by the PCM 14 in the step S2 of the driving force control processing in FIG. 3, or is calculated by the PCM 14 based on the vehicle speed input from the vehicle speed sensor 20.

As mentioned above, the torque fluctuation component on the output shaft of the engine 2 is obtained by combining the indicator torque fluctuation component, and the inertial torque fluctuation component having a phase opposite to that of the indicator torque fluctuation component. Therefore, as shown in FIG. 9A, under the condition that the average engine torque and the engine speed are constant, the amplitude of the torque fluctuation component of the engine 2 is constant, irrespective of the magnitude of the vehicle acceleration set or calculated by the PCM 14.

In this case, as shown in FIG. 9B, the absolute value of the control gain ("K" in FIG. 4) is set such that it becomes larger as the vehicle acceleration of the vehicle 1 set or calculated by the PCM 14 becomes closer to 0.

Thus, as shown in FIG. 9C, the absolute value of the countertorque amplitude becomes larger as the vehicle acceleration of the vehicle 1 set or calculated by the PCM 14 becomes closer to 0.

More specifically, as the vehicle acceleration of the vehicle 1 becomes closer to 0, i.e., as a change in the vehicle speed becomes smaller, a change in the engine speed becomes smaller, so that the frequency of the torque fluctuation component of the engine 2 is less likely to change.

In this situation, the frequency of vibration associated with the torque fluctuation of the engine 2 is less likely to change, so that resonance is more likely to occur in the vibration transmission path extending from the engine 2 to the floor panel of the passenger compartment, and the floor panel of the passenger compartment is more likely to be largely vibrated. Further, in the situation where the frequency of vibration in the floor panel of the passenger compartment is constant, a passenger becomes more likely to feel vibration. Therefore, the absolute value of the countertorque amplitude is set such that it becomes larger as the vehicle acceleration of the vehicle 1 set or calculated by the PCM 14 becomes closer to 0. This makes it possible to reliably absorb the torque fluctuation component of the engine 2 by the countertorque, thereby suppressing vibration associated with the torque fluctuation of the engine 2.

LIST OF REFERENCE CHARACTERS

1: vehicle
2: engine
4: motor
6: automatic transmission
8: differential unit
10: battery
12: inverter
14: PCM
16: TCM
18: accelerator position sensor
20: vehicle speed sensor
22: crank angle sensor
24: airflow sensor
26: motor angle sensor
28: throttle valve unit
30: fuel injector
32: ignition unit
34: intake-exhaust valve mechanism
36: average engine torque estimation part
38: torque fluctuation component estimation part
40: motor instruction torque determination part

The invention claimed is:

1. A driving force control method for a hybrid vehicle equipped with an internal combustion engine, a driving force transmission mechanism for transmitting driving force of the internal combustion engine to drive wheels, and an electric motor coupled to the internal combustion engine and capable of outputting driving force to the driving force transmission mechanism, the driving force control method comprising the steps of:
    estimating an average torque output by the internal combustion engine;
    estimating a torque fluctuation component of the average torque output by the internal combustion engine;
    setting a countertorque for suppressing the estimated torque fluctuation component; and
    controlling the electric motor to output the set countertorque, wherein
    the step of setting a countertorque includes: a sub-step of, under a condition that the average torque output by the internal combustion engine is constant, when an engine speed of the internal combustion engine is equal to or greater than a first given value, setting a negative control gain such that, as the engine speed of the internal combustion engine becomes higher, an absolute value of the negative control gain becomes smaller; and a sub-step of setting the countertorque based on a product of the estimated torque fluctuation component and the negative control gain, and the step of setting a countertorque further includes a sub-step of, under a condition that the engine speed of the internal combustion engine is constant, when the average torque output by the internal combustion engine is equal to or greater than a second given value, setting the negative control gain such that, as the average torque output by the internal combustion engine becomes larger, the absolute value of the negative control gain becomes smaller.

2. The driving force control method as recited in claim 1, wherein the step of setting a countertorque includes a sub-step of, under a condition that the engine speed of the internal combustion engine is constant, when the average torque output by the internal combustion engine is less than a third given value, setting the negative control gain such that, as the average torque output by the internal combustion engine becomes larger, an absolute value of the countertorque becomes larger.

3. A driving force control device for a hybrid vehicle equipped with an internal combustion engine, a driving force transmission mechanism for transmitting driving force of the internal combustion engine to drive wheels, and an electric motor coupled to the internal combustion engine and capable of outputting driving force to the driving force transmission mechanism, the driving force control device comprising a processor configured to:

estimate an average torque output by the internal combustion engine;

estimate a torque fluctuation component of the average torque output by the internal combustion engine;

set a countertorque for suppressing the estimated torque fluctuation component; and control the electric motor to output the set countertorque, wherein the processor is configured to implement setting the countertorque under a condition that the average torque output by the internal combustion engine is constant, when an engine speed of the internal combustion engine is equal to or greater than a first given value, to set a negative control gain such that, as the engine speed of the internal combustion engine becomes higher, an absolute value of the negative control gain becomes smaller, and then to set the countertorque based on a product of the estimated torque fluctuation component and the negative control gain, and the processor is further configured to implement setting the countertorque, under a condition that the engine speed of the internal combustion engine is constant, when the average torque output by the internal combustion engine is equal to or greater than a second given value, to set the negative control gain such that, as the average torque output by the internal combustion engine becomes larger, the absolute value of the negative control gain becomes smaller.

4. The driving force control device as recited in claim 3, wherein the processor is further configured to implement setting the countertorque under a condition that the engine speed of the internal combustion engine is constant, when the average torque output by the internal combustion engine is less than a third given value, to set the negative control gain such that, as the average torque output by the internal combustion engine becomes larger, an absolute value of the countertorque becomes larger.

* * * * *